(12) United States Patent
Pasko et al.

(10) Patent No.: US 11,563,273 B2
(45) Date of Patent: Jan. 24, 2023

(54) ANTENNA

(71) Applicant: Schaffner EMV AG, Luterbach (CH)

(72) Inventors: Szymon Pasko, Orzesze (PL); Stéphane Lebreton, Morschwiller-le-bas (FR); Shemsi Musiqi, Rüttenen (CH); Luca Dalessandro, Zürich (CH)

(73) Assignee: Schaffner EMV AG, Luterbach (CH)

( * ) Notice: Subject to any disclaimer, the term of this patent is extended or adjusted under 35 U.S.C. 154(b) by 97 days.

(21) Appl. No.: 16/845,845

(22) Filed: Apr. 10, 2020

(65) Prior Publication Data

US 2020/0328513 A1  Oct. 15, 2020

(30) Foreign Application Priority Data

Apr. 12, 2019  (EP) .................................... 19169036

(51) Int. Cl.
  *H01Q 7/08* (2006.01)
  *B60R 25/20* (2013.01)
  *H01Q 1/32* (2006.01)

(52) U.S. Cl.
  CPC ............. *H01Q 7/08* (2013.01); *B60R 25/209* (2013.01); *H01Q 1/3208* (2013.01)

(58) Field of Classification Search
  CPC ...... H01Q 7/08; H01Q 1/3241; H01Q 1/3283; H01Q 1/40; H01Q 1/3208; H01Q 1/22; H01Q 1/273; H01Q 1/32; H01Q 7/06; H01Q 1/085; H01Q 1/02; H01Q 1/2208; H01Q 1/36; H01Q 7/005; H01Q 1/405; H01Q 1/44; H01F 3/10; H01F 17/045; H01F 27/022; H01F 27/26; H01F 27/263; H01F 3/14; H01F 41/005; H01F 27/266; H01F 5/00; H01F 5/06; H01F 1/14766; H01F 27/025; H01F 27/24; H01F 27/25; H01F 27/255; H01F 27/28; H01F 27/306; H01F 27/324; H01F 3/06; H01F 3/08; H01F 37/00; H01F 41/0206; H01F 41/0213; B60R 25/209; B60R 25/24; B60R 16/0215; B60R 16/0222; H05K 1/189; H05K 2201/09018; H05K 2201/10151; H05K 3/284; B29C 2043/486; B29C 70/56; B29C 33/00; H01R 13/405; H01R 13/41

See application file for complete search history.

(56) References Cited

U.S. PATENT DOCUMENTS

| 6,919,856 B2 | 7/2005 | Swoboda |
| 10,056,687 B2 | 8/2018 | Rojas Cuevas et al. |
| 10,062,484 B2 | 8/2018 | Navarro Perez et al. |
| 2003/0231020 A1* | 12/2003 | Yonezawa .................. F16L 1/11 343/719 |
| 2018/0122551 A1* | 5/2018 | Yoshikawa ............. H01F 37/00 |
| 2018/0159224 A1 | 6/2018 | Inoue et al. |
| 2020/0190870 A1* | 6/2020 | Kalesse ................ H01R 13/405 |

FOREIGN PATENT DOCUMENTS

| DE | 102005057556 A1 | 5/2007 |
| DE | 102016010493 A1 | 3/2018 |
| EP | 1397845 A2 | 3/2004 |
| FR | 2920916 A1 | 3/2009 |

* cited by examiner

*Primary Examiner* — Andrea Lindgren Baltzell
(74) *Attorney, Agent, or Firm* — Blank Rome LLP

(57) ABSTRACT

Antenna having a housing (3), a core (1) and a coil (2), which is wound around the core (1), the core (1) with the coil (2) in a potting compound (5) being mounted in the housing (3), the potting compound (5) being softer than 40 Shore A.

11 Claims, 3 Drawing Sheets

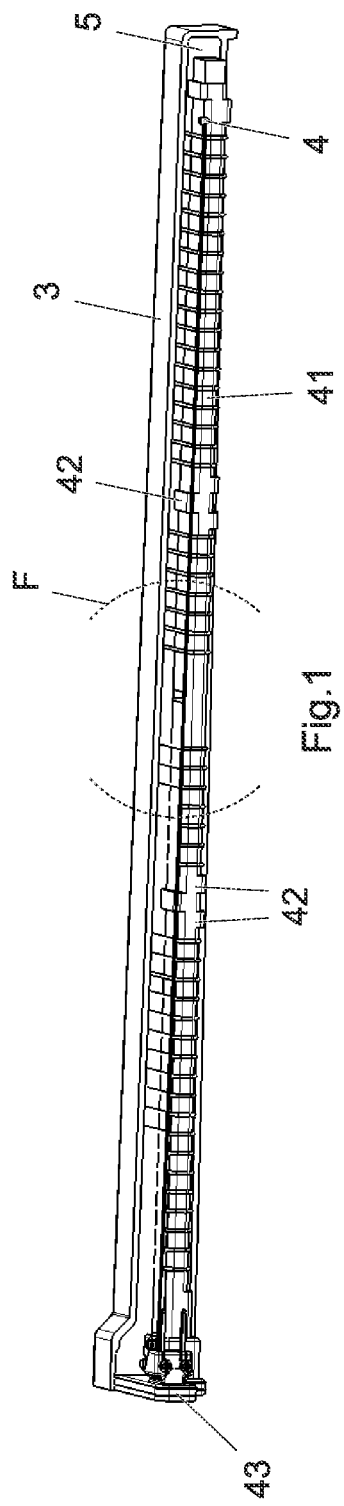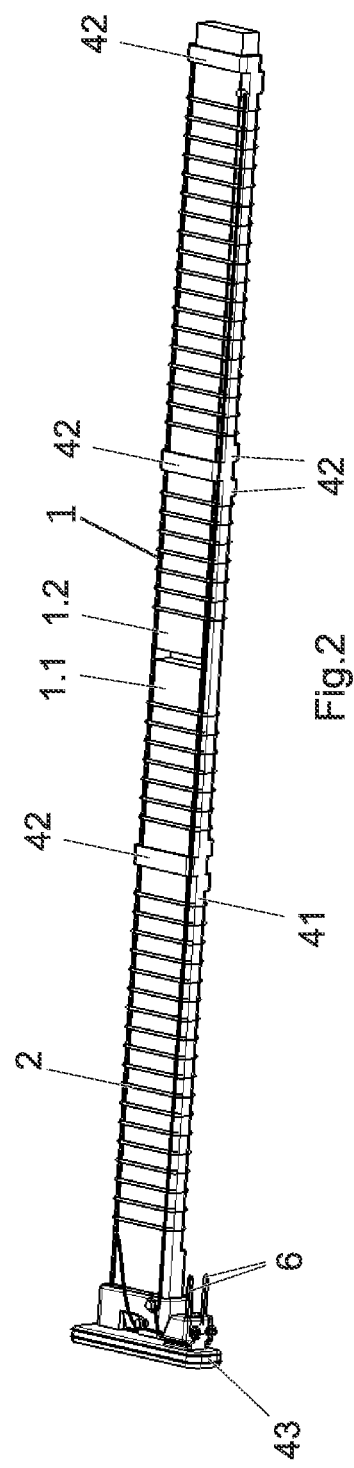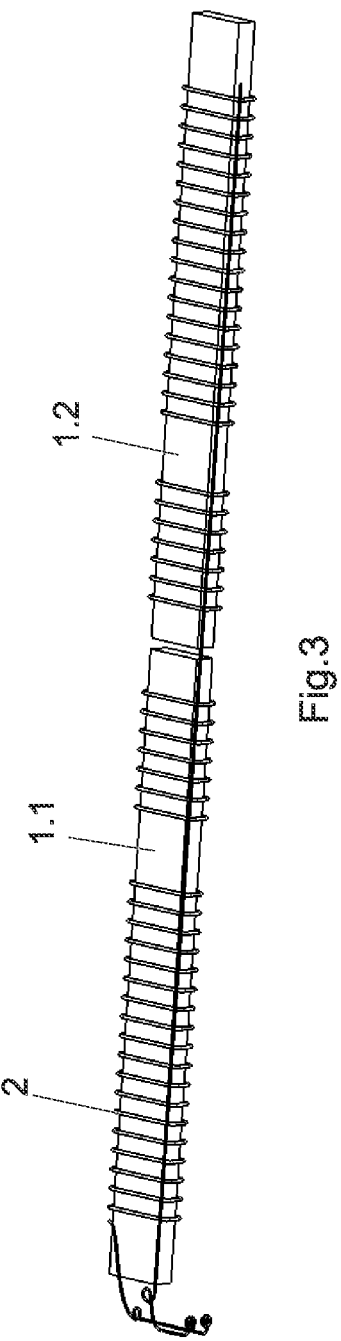

ANTENNA

RELATED APPLICATION

The present application claims the benefit of European Patent Application EP20190169036, filed Apr. 12, 2019. The entire disclosure of which is hereby incorporated by reference.

TECHNICAL FIELD

The invention relates to an antenna, in particular to an antenna for use in a vehicle designed for the transmission of key data for opening and/or starting the vehicle.

PRIOR ART

Antennas generally consist of a ferromagnetic core and a coil. The antennas are generally potted in a housing. Depending on the transmission frequency and the bandwidth, the core and the coil must be correspondingly designed. The bandwidths of antennas are becoming ever wider, for example for UWB antennas, and the range of the antenna is becoming ever greater, which has the consequence for example that the cores are also becoming ever longer. However, long cores are also more liable to rupture than short cores and are more difficult to produce.

It has therefore become known in the meantime to form the core by a plurality of partial cores arranged one behind the other, for example in U.S. Pat. No. 10,056,687, EP1397845, US2018159224. This has the advantage that the individual partial cores are easier to produce and the partial cores are less liable to rupture. However, it has been found that the magnetic properties of the core formed from a number of partial cores are very susceptible to shocks or temperature fluctuations and these antennas often have problems with respect to the stability of the antenna properties.

In principle, it would be possible to use a softer potting compound, which damps shocks better, and consequently reduces the liability to rupture. However, there are strict quality requirements for the positioning of the antenna parts, which only allow a very small tolerance for the positioning of the antenna parts in order that the stability of the electrical properties of the antenna is not impaired. For this reason, the potting compound is chosen to be not too soft.

An alternative approach is taken in U.S. Pat. No. 10,062,484. Here, thin magnetic wires are embedded in a non-magnetic soft material, and flexible magnetic cores are thereby created. However, these flexible magnetic cores have poorer magnetic properties then classic (hard) magnetic cores.

SHORT DESCRIPTION OF THE INVENTION

It is an aim of the invention to find an antenna that is robust, easy to produce and has good, stable antenna properties.

This aim is achieved according to the invention in the case of an antenna and a production process for such an antenna according to the independent claims.

The use of a potting compound 5 softer than 40 Shore A creates very robust antennas on account of the very good damping. Surprisingly, however, the antenna properties are also very stable. The reason for this is perhaps that, in the case of harder potting compounds 5, a shock causes the potting compound 5 or the positioning means to be damaged, and consequently causes permanent incorrect positioning of the antenna or of antenna parts. The use of very soft potting compounds has the effect that the shock only causes a very short displacement of the antenna parts in the potting compound, and the antenna parts are returned again afterwards to the same original location. According to the invention, a short time in which the specified tolerances are exceeded is accepted in order to improve the long-term stability of the antenna. Consequently, a very robust antenna with very good electrical properties is created by the very soft potting compound.

Alternatively, the object is also achieved by an antenna having a core and a coil, which is wound around the core, with one or a combination of the following features. This antenna may also have no potting compound or a harder potting compound.

Further advantageous embodiments are specified in the dependent claims.

In one exemplary embodiment, the potting compound is softer than 35 Shore A, preferably softer than 30 Shore A, preferably softer than 27 Shore A, preferably softer than 25 Shore A. These hardnesses of the potting compound produce even better values for the rupture stability and the stability of the electrical values. In one exemplary embodiment, the potting compound is harder than 10 Shore A, preferably than 15 Shore A. In this range above 10 or 15 Shore A, an optimum between rupture stability and electrical stability is achieved.

In one exemplary embodiment, the core has a plurality of partial cores, the plurality of partial cores comprising a first partial core and a second partial core. A number of partial cores makes the production of the core easier and improves its rupture stability. The soft potting compound is advantageous in particular for exemplary embodiments with partial cores. It has been found that the soft potting compound has the effect that the relative position of the two partial cores is influenced less after shocks, and consequently the electrical parameters of the antenna are influenced less. In one exemplary embodiment, the first partial core is arranged at a distance from the second partial core. This has proven to be particularly advantageous in particular in combination with the soft potting compound. The soft potting compound allows the partial cores a certain freedom of movement when they undergo a shock. If the partial cores are in contact with one another, a shock is transferred from the first partial core to the second partial core, and can consequently make the probability of the partial cores rupturing increase again, in spite of the soft potting compound. This is avoided by the gap between the partial cores. If the partial cores are in contact with one another, the magnetic properties of the entire core depend very much on the force with which the two partial cores are pressed against one another. Due to the soft potting compound, the contact pressure of the two partial cores could vary greatly, and even lead to a separation of the partial cores. This variation of the contact pressure could be caused by vibrations, shocks or else a variation of the temperature. This leads to great electrical instabilities of the antenna, which are not desired. For this reason, when the soft potting compound is used in combination with a plurality of partial cores, it is particularly advantageous to use a gap between the partial cores. As a result, the thermal and electrical stability of the antenna is improved significantly. In one exemplary embodiment, the gap formed by the distance is filled by the potting compound. Consequently, the potting compound between the partial cores likewise acts as a damper and also acts just as well in dissipating the heat between the partial cores into the rest of the potting compound.

In one exemplary embodiment, the first partial core has a first longitudinal axis and the second partial core has a second longitudinal axis. In one exemplary embodiment, the first partial core and the second partial core are arranged such that the second longitudinal axis extends as an extension of the first longitudinal axis. In one exemplary embodiment, the first partial core has a first cross section at right angles to the first longitudinal axis and the second partial core has a second cross section at right angles to the second longitudinal axis. In one exemplary embodiment, the second cross section corresponds to the first cross section. In one exemplary embodiment, the first partial core and the second partial core are arranged such that the first cross section is arranged flush with the second cross section. In one exemplary embodiment, the first partial core has the same first cross section along the entire first longitudinal axis. In one exemplary embodiment, the second partial core has the same second cross section along the entire second longitudinal axis.

In one exemplary embodiment, the first partial core has a first end and a second end opposite from the first end. In one exemplary embodiment, the second partial core has a first end and a second end opposite from the first end. In one exemplary embodiment, the first end of the first partial core is arranged opposite the first end of the second partial core.

In one exemplary embodiment, the antenna has a core support. The core support allows certain movements of the core that are undesired for the electrical stability to be prevented and other movements that are desired for the electrical stability and the rupture stability to be allowed. In one exemplary embodiment, the core support supports the first and second partial cores. In particular for exemplary embodiments with two partial cores, in particular with those with a gap, a core support is very advantageous, since it helps with the otherwise complicated positioning.

In one exemplary embodiment, the core support extends from the second end of the first partial core to the second end of the second partial core (apart from a possibly protruding end of one partial core, for example up to 10%, preferably up to 5%, of the length of the core 1). This allows stable securing of the partial cores over the length of the core 1.

In one exemplary embodiment, the coil is wound onto the core support. This has the advantage that the partial cores are held stably during the winding of the coil. In one exemplary embodiment, the coil is wound such that the coil extends over more than 80% of the length between the two ends of the partial cores.

In one exemplary embodiment, the core support is designed to push the first partial core and/or the second partial core into the core support in the direction of the longitudinal axis of the corresponding partial core for fitting before the partial cores, the core support and the coil are potted in the housing with the potting compound.

In one exemplary embodiment, the core support with the fitted partial cores and the coil is designed to displace the first partial core and/or the second partial core in the direction of the longitudinal axis of the corresponding partial core before the partial cores, the core support and the coil are potted in the housing with the potting compound.

In one exemplary embodiment, the core support with the fitted partial cores and the coil is designed to fix the first partial core and/or the second partial core at right angles to the direction of the longitudinal axis of the corresponding partial core before the partial cores, the core support and the coil are potted in the housing with the potting compound.

In one exemplary embodiment, the position of the core support, the coil, the first partial core and/or the second partial core is fixed in the housing by the potting compound.

In one exemplary embodiment, the antenna is designed for use in a vehicle and/or for the transmission of key data for opening and/or starting the vehicle.

In one exemplary embodiment, a vehicle has an antenna as described above.

BRIEF DESCRIPTION OF THE FIGURES

The invention is explained more specifically on the basis of the accompanying figures, in which FIG. 1 shows a 3D view of a first exemplary embodiment of an antenna with a half cut-open housing and potting compound.

FIG. 2 shows a 3D view of the first exemplary embodiment of the antenna without a housing and potting compound.

FIG. 3 shows a 3D view of the first exemplary embodiment of the antenna without a core support, housing and potting compound.

EXEMPLARY EMBODIMENT(S) OF THE INVENTION

Figure 4:
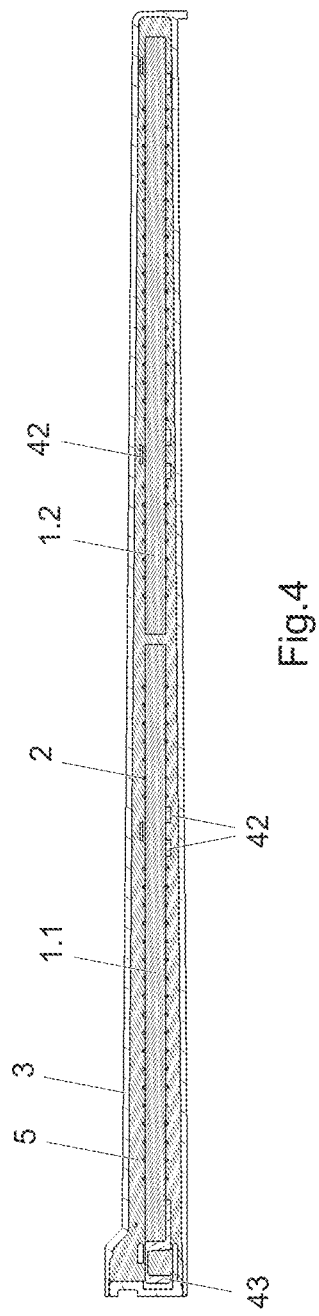
FIG. 4 shows a first sectional view through the antenna according to the first exemplary embodiment.
Figure 5:
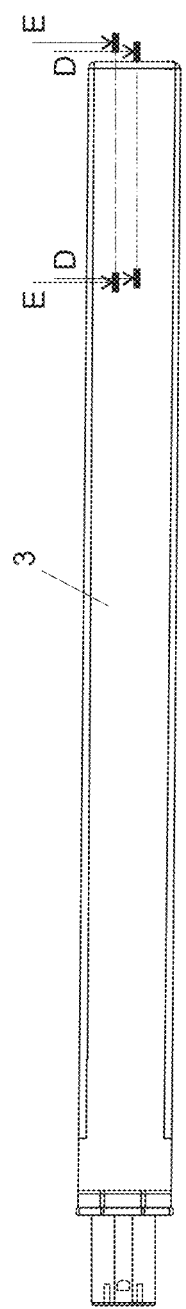
FIG. 5 shows a plan view of the antenna according to the first exemplary embodiment.
Figure 6:
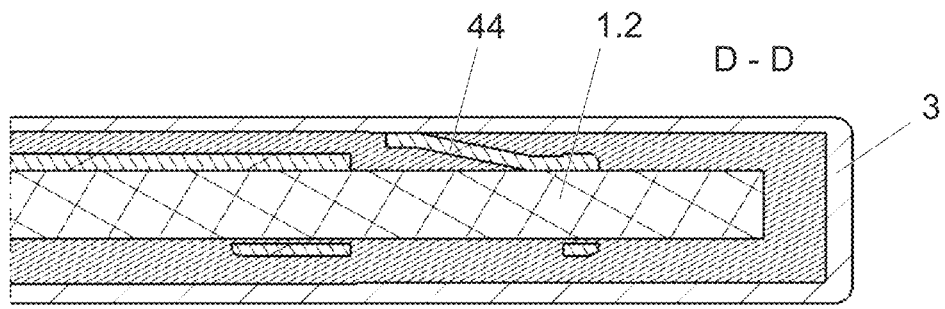
FIG. 6 shows a second sectional view through the antenna according to the first exemplary embodiment along the line D-D.
Figure 7:
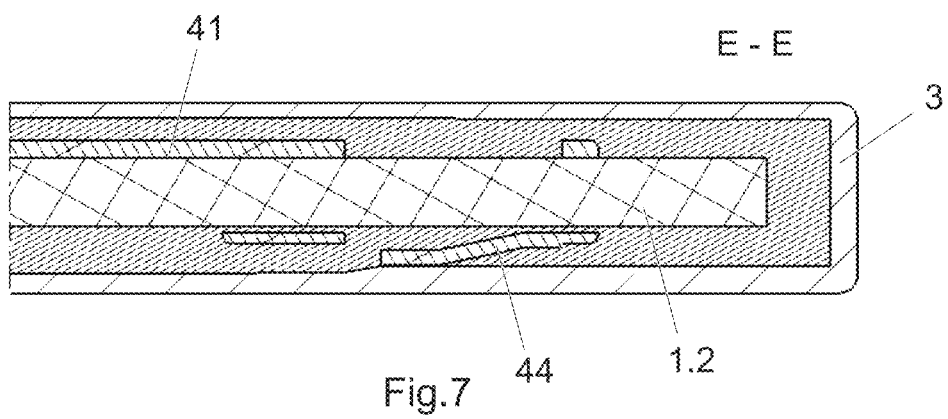
FIG. 7 shows a third sectional view through the antenna according to the first exemplary embodiment along the line E-E.
Figure 8:
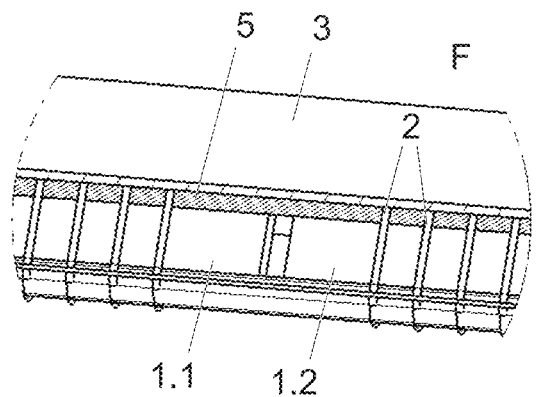
FIG. 8 shows an enlargement of the detail F from FIG. 1.

FIGS. 1 to 8 show an exemplary embodiment of the invention.

The antenna has a core 1, a coil 2, a housing, a core support 4 and a potting compound 5.

The core 1 is a magnetic core. The core 1. preferably extends along a longitudinal axis. The core 1 is preferably longer in the direction of the longitudinal axis than in the other directions/axes (at right angles to the longitudinal axis). The core 1 is made of a magnetic material. The core is preferably made of a ferrite material (ferrite material) or a powder material (powder core), for example a ferrite material. Magnetic material means that the material is at least paramagnetic, preferably ferromagnetic. The magnetic core 1 is made of a hard material, i.e. the magnetic core 1 is not elastic or flexible. The magnetic core 1 preferably has a rectangular cross section.

The magnetic core preferably consists of a plurality of partial cores 1.1 and 1.2. The material properties of the core 1, as described above, apply correspondingly for each partial core 1.1, 1.2. The same magnetic materials are preferably used for different partial cores 1.1 and 1.2. The plurality of partial cores 1.1 and 1.2 comprise at least two partial cores 1.1 and 1.2 with a first partial core 1.1 and a second partial core 1.2. The first partial core has a first longitudinal axis. The second partial core has a second longitudinal axis. The first partial core 1.1 and the second partial core 1.2 are preferably arranged such that the second longitudinal axis extends as an extension of the first longitudinal axis (so that the first and second longitudinal axes form the longitudinal axis of the core 1). That is to say that the first and second longitudinal axes are not kinked, are arranged at 0° or 180° and/or are parallel/coaxial/overlapping in relation to one another. The first partial core 1.1 has a first end and a second end, lying opposite the first end (in the direction of the first longitudinal axis). The second partial core 1.2 has a first end and a second end, lying opposite the first end (in the direction of the second longitudinal axis). The first end of the first partial core 1.1 is preferably arranged opposite the first end of the second partial core 1.2. Consequently, the second end of the first partial core 1.1 forms a first end of the core 1 and, if the core 1 consists of two partial cores 1.1,1.2, the second end of the second partial core 1.2 forms a second end of the core 1. The first partial core 1.1 has a first cross section at right angles to the first longitudinal axis. The second partial core 1.2 has a second cross section at right angles to the second longitudinal axis. The second cross section preferably corresponds to the first cross section. The first partial core 1.1 and the second partial core 1.2 are preferably arranged such that the first cross section of the first partial core 1.1 is arranged flush with the second cross section of the second partial core 1.2. This is intended to mean that the second partial core 1.2 forms the extension of the first partial core 1.1 in the first or second longitudinal axis, the two partial cores 1.1 having coaxially arranged longitudinal axes and the same cross sections (which in the case of non-rotationally symmetrical cross sections are arranged such that the cross sections overlap completely). The first partial core 1.1 preferably has the same first cross section along the entire first longitudinal axis. The second partial core 1.2 preferably has the same second cross section along the entire second longitudinal axis. The first partial core 1.1 and the second partial core 1.2 are preferably identical, so that the same parts can be used for both partial cores 1.1, 1.2. The first partial core 1.1 is preferably arranged at a distance from the second partial core 1.2. As a result, a gap is produced between the first partial core 1.1 and the second partial core 1.2. The distance between the first partial core 1.1 and the second partial core 1.2 is preferably greater than 0.1 mm, preferably greater than 0.3 mm, preferably greater than 0.5 mm, preferably greater than 1 mm. The gap is preferably less than 10 mm, preferably less than 7 mm, preferably than 5 mm, since too great a gap could adversely influence the magnetic field lines between the two partial cores 1.1, 1.2.

The coil 2 is wound onto the core 1. The coil 2 preferably has a plurality of turns around the core 1, preferably with more than two, preferably with more than five, preferably with more than ten, preferably with more than fifteen, preferably with more than twenty turns. The coil 2 preferably extends from the first end of the core 1 or the second end of the first partial core 1.1 to the second end of the core 1 or the second end of the second partial core 1.2, so that the region between the last turn of the coil 2 in the direction of the first end of the core 1 or the second end of the first partial core 1.1 and the last turn of the coil 2 in the direction of the second end of the core 1 or the second end of the second partial core 1.2 makes up at least 70%, preferably at least 75%, preferably at least 80%, of the longitudinal extent of the core 1 or of the two partial cores 1.1, 1.2 together, Preferably, the coil 2 extends over both partial cores 1.1, 1.2. The coil 2 preferably extends over both partial cores 1.1, 1.2. The coil 2 or a coil wire of the coil 2 is preferably wound onto the core support 4. However, it is also possible to wind the coil 2 or the coil wire directly onto the core 1 (without a core support 4). The coil 2 preferably has a coil wire, which is wound around the core 1 or the core support 4. The coil wire is preferably insulated. The coil wire may, however, also be uninsulated. However, it must then be ensured during the winding that, when crossing over, the wire does not touch itself and also does not touch the core 1. The coil wire is preferably wound such that both ends of the coil wire are connected at one end of the core 1 to terminals of the antenna. In the exemplary embodiment shown, the coil 2 is wound in a direction from the first end of the core 1 to the second end of the core 1 and the coil wire is then returned from the second end of the core 1 to the first end of the core 1 (without turns around the core 1). However, it would also be possible first to lead the coil wire from the first end of the core 1 to the second end of the core 1 (without turns around the core 1) and then to wind it in a direction from the second end of the core 1 to the first end of the core 1. It is also possible to wind the coil wire in both directions (cross winding).

The core support 4 is designed to support/hold the core 1. This is especially important for the fitting of the antenna before potting, so that all of the antenna parts are held in the correct position before the antenna is potted. Unless explicitly described otherwise, the features of the core support 4 described below therefore relate to the state before the potting of the antenna. The core support 4 is preferably designed to support the core 2. The core support 4 preferably has an internal opening, in which the core 1 is held. The core support 4 preferably has an outer surface, on which the coil 2 is wound. The core support 4 is advantageous in particular for the exemplary embodiments with a plurality of partial cores 1.1, 1.2. The core support 4 preferably fixes the position of the partial cores 1.1, 1.2 (at least in one direction). The core support 4 preferably fixes the partial cores 1.1, 1.2 such that they are at right angles to the longitudinal axis of the core 1 or of the partial cores 1.1, 1.2 (at least in one direction, preferably in all directions 330°, preferably 350°, radially around the longitudinal axis, preferably in all directions radially around the longitudinal axis). Preferably, at least one of the two partial cores 1.1, 1,2 (or else both) can be moved in the direction of the longitudinal axis when the two partial cores 1.1, 1.2 are fitted in the core support 4 and the coil 2 is wound around the core 1 on the core support 4. Thus, the fitted antenna can still be finely adjusted before the potting, in that the distance between the two partial cores 1.1, 1.2 is set such that the desired antenna properties are obtained. However, it is also possible that the two partial cores 1.1, 1.2 are completely fixed in their position, so that the partial cores 1.1, 1.2 cannot move their position (absolutely and/or relative to one another). Preferably, for fitting, the partial cores 1.1, 1.2 are inserted in the direction of the longitudinal axis of the core 1 or of the partial cores 1.1, 1.2. This allows that the partial cores 1.1, 1.2 can be stably positioned in relation to one another and nevertheless can be moved axially in relation to one another. However, it is also possible to insert the partial cores 1.1, 1.2 differently into the core support 4. The core support 4 preferably extends from the second end of the first partial core to the second end of the second partial core. This allows stable securing of the partial cores 1.1, 1.2. This is advantageous for the positioning during production, and also stabilizes the potted partial cores 1.1, 1.2 later during use. In the exemplary embodiment shown, the core support 4 has at least one, preferably two, parallel longitudinal support(s) 41 (which extends/extend in the direction of the longitudinal axis of the core 1). The core support 4 preferably has a plurality of transverse supports 42, which prevent/block the movement of the partial cores 1.1, 1.2 radially in relation to the longitudinal axis of the core 1. In the region of the transverse supports 42, the winding of the coil 2 is preferably interrupted. Preferably, the transverse supports 42 in each case connect the two longitudinal supports 41. For the description, four sides (at right angles to the longitudinal axis of the core 1) of the core 1 are referred to as the upper side (or first side), lower side (or second side) and two lateral sides (third and fourth sides), without this however restricting the invention to a specific alignment of the antenna. Preferably, the upper and lower sides are arranged opposite and/or the two lateral sides are arranged opposite. There are preferably upper transverse supports 42, against which the upper side of the core 1 lies. There are preferably lower transverse supports 42, against which the lower side of the core 1 lies. The two longitudinal supports are preferably arranged on the two lateral sides of the core 1, so that the two lateral sides of the core 1 lie against the two longitudinal supports. The core support 4 preferably has at one end a closure region 43, which is designed to close an opening in the housing 3 when the core support 4 (with the core 1 and the coil 2) is fitted in the housing 3. The closure region 43 may in this case be produced integrally in one piece with the rest of the core support 4. It is however also possible that the closure region 43 and the rest of the core support 4 are put together from separate parts. The closure region 43 preferably has a terminal for the electrical connection of the antenna, in particular the coil 2. The terminal preferably has two electrically conducting rods, which extend through the closure region 43. One side of each conducting rod in this case protrudes out of the closure region 43 on the outer side, so that the finished antenna can be electrically connected. The opposite side of each conducting rod protrudes out on the inner side of the closure region 43, the ends of the coil 2 or of the coil wire being connected in each case to one of these conducting rods (on the inner side). The core support 4 is preferably formed such that the core support 4 has a predefined position after fitting in the housing 3. On one side of the antenna, this is achieved for example by the positioning of the closure region 43 in the opening in the housing 3. The core support 4 preferably also has positioning means 44, which hold the core support 4 in the predefined position when the core support 4 is fitted in the housing 3. The positioning means 44 are preferably arranged on the region of the core support 4 opposite from the closure region 43. The positioning means 44 are preferably resilient, so that the positioning means 44 define the predefined position, but allow deviations from the predefined position when there are vibrations or shocks. The positioning means 44 are preferably flexible/resilient arms 44, which press against the inner wall of the housing 3 and thus bring the core support 4 into the predefined position in the housing 3. This is shown in the sections D-D and E-E in FIGS. 6 and 7. The core support 4 is preferably produced from a plastic.

The housing 3 is designed to enclose the core 1 with the coil 2. The housing 3 is preferably designed to enclose the core support 4 with the core 1 and the coil 2. The housing 3 preferably has an opening, which is designed for inserting the core 1 with the coil 2 or the core support 4 with the core 1 and the coil 2 into the housing 3. The opening is preferably closed by the core support 4 in the inserted state. However, it is also possible that the opening is closed by a separate cover.

A potting compound 5 is arranged between the housing 3 and the core 1 with the coil 2 or the core support 4 with the core 1 and the coil 2. The core 1 with the coil 2 or the core support 4 with the core 1 and the coil 2 is inserted into the housing 3 and potted therein with the potting compound 5. The potting compound 5 is also often referred to as potting. The potting compound 5 preferably fills the, preferably all of the, cavities in the housing 3, so that the heat is effectively dissipated from the core 1 and the coil 2, and the core 1 with the coil 2 or the core support 4 with the core 1 and the coil 2 is stably mounted. According to the invention, a potting compound 5 which (in the cured state) is softer than 40 Shore A, preferably than 35 Shore A, preferably than 30 Shore A, preferably than 27 Shore A, preferably than 25 Shore A is used. It has been found that the potting compound 5 softer than 40 Shore A or than the preferred values mentioned, not only improves the rupture stability, but surprisingly also improves the stability of the electrical values of the antenna. Preferably, however, the potting compound 5 (in the cured state) is harder than 10 Shore A, preferably than 15 Shore A. The potting compound 5 with a deformation between 10 and 40 Shore A has been found to be particularly advantageous.

For producing the antenna, first the core 1, possibly with the partial cores 1.1, 1.2, is fitted into the core support 4. The coil 2 is wound onto the core support 4 or the core 1. The coil wire is connected to the terminal of the antenna. The core 1 with the coil 2 or the core support 4 with the core 1 and the coil 2 is inserted into the housing 3. The core 1 with the coil 2 or the core support 4 with the core 1 and the coil 2 is potted in the housing 3 with the potting compound 5. After that, the potting compound 5 cures and the antenna is finished.

The invention claimed is:

1. Antenna comprising a housing, a core and a coil, which is wound around the core, the core with the coil in a potting compound being mounted in the housing, wherein the potting compound in the cured state has a hardness less than 40 Shore A, wherein the core having a plurality of partial cores, the plurality of partial cores comprising a first partial core and a second partial core and having a core support, the first partial core and the second partial core being held in the core support, wherein the core support is configured with a plurality of positioning means for holding the core support in a predetermines position when fitted in the housing, wherein the positioning means are resilient, such that they press against an inner wall of the housing and thus bring the core support into a predetermined position in the housing.

2. Antenna according to claim 1, the first partial core having a first longitudinal axis and the second partial core having a second longitudinal axis, the first partial core and the second partial core being arranged such that the second longitudinal axis extends as an extension of the first longitudinal axis.

3. Antenna according to claim 2, the first partial core having a first cross section at right angles to the first longitudinal axis, the second partial core having a second cross section at right angles to the second longitudinal axis, which corresponds to the first cross section, wherein
   the first partial core and the second partial core are arranged such that the first cross section is arranged flush with the second cross section, or
   the first partial core has the same first cross section along the entire first longitudinal axis or the second partial core has the same second cross section along the entire second longitudinal axis.

4. Antenna according to claim 2, the first partial core being arranged at a distance from the second partial core, and a gap formed by the distance being filled by the potting compound.

5. Antenna according to claim 1, the first partial core havirig a first end and a second end opposite from the first end, the second partial core having a first end and a second end opposite from the first end, the first end of the first partial core being arranged opposite the first end of the second partial core, the core support extending from the second end of the first partial core to the second end of the second partial core.

6. Antenna according to claim 1, the coil being wound onto the core support, wherein the coil is wound such that the coil extends over more than 80% of the length between the second ends of the partial cores.

7. Antenna according to claim 1, the core support is fitted with a first partial core and a second partial core, and the coil being designed to displace the first partial core or the second partial core in the direction of a longitudinal axis of the corresponding partial core before the partial cores, the core support and the coil arc potted in the housing with the potting compound.

8. Antenna according to claim 1, the core support is fitted with a first partial core and a second partial core, and the coil being designed to fix the first partial core or the second partial core at right angles to the direction of a longitudinal axis of the corresponding partial core before the partial cores, the core support and the coil are potted in the housing with the potting compound.

9. Antenna according to claim 1, the position of the core support, the coil, the first partial core or the second partial core being fixed in the housing by the potting compound.

10. Antenna according to claim 1 for use in a vehicle designed for the transmission of key data for opening or starting the vehicle.

11. Vehicle having an antenna according to claim 10.

\* \* \* \* \*